US010326836B2

United States Patent
Chawla et al.

(10) Patent No.: US 10,326,836 B2
(45) Date of Patent: Jun. 18, 2019

(54) PARTIALLY REPLICATING A SNAPSHOT BETWEEN STORAGE SYSTEMS

(71) Applicant: Pure Storage, Inc., Mountain View, CA (US)

(72) Inventors: Deepak Chawla, Redwood City, CA (US); John Colgrove, Los Altos, CA (US); Terence Noonan, Vadnais Heights, MN (US); Vinay Perneti, Mountain View, CA (US); Jikui Su, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 214 days.

(21) Appl. No.: 14/962,887

(22) Filed: Dec. 8, 2015

(65) Prior Publication Data
US 2017/0163728 A1    Jun. 8, 2017

(51) Int. Cl.
*G06F 15/16*    (2006.01)
*H04L 29/08*    (2006.01)
(Continued)

(52) U.S. Cl.
CPC .......... *H04L 67/1095* (2013.01); *G06F 3/065* (2013.01); *G06F 3/067* (2013.01);
(Continued)

(58) Field of Classification Search
CPC ............. H04L 67/1095; H04L 67/1097; G06F 11/2064
(Continued)

(56) References Cited

U.S. PATENT DOCUMENTS 5,706,210 A    1/1998    Kumano et al.
5,799,200 A    8/1998    Brant et al.
(Continued)

FOREIGN PATENT DOCUMENTS

EP    0725324 A2    8/1996
WO    WO 2012/087648 A1    6/2012
(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.
(Continued)

*Primary Examiner* — Bharat Barot

(57) ABSTRACT

Synchronizing snapshots between storage systems, including: receiving, from a source storage system, an identification of a snapshot to be replicated to a destination storage system; identifying, from hint information stored on the destination storage system, a most recent version of the snapshot that is stored on the destination storage system; issuing, to the source storage system, a request for an identification of the differences between the snapshot to be replicated to the destination storage system and the most recent version of the snapshot that is stored on the destination storage system; receiving, from the source storage system, the identification of the differences; and issuing a request to transfer, from the source storage system to the destination storage system, data associated with the differences.

20 Claims, 7 Drawing Sheets

(51) Int. Cl.
  *G06F 3/06* (2006.01)
  *G06F 11/20* (2006.01)
(52) U.S. Cl.
  CPC .......... *G06F 3/0608* (2013.01); *G06F 3/0619* (2013.01); *G06F 3/0659* (2013.01); *G06F 11/2064* (2013.01); *H04L 67/1097* (2013.01)
(58) Field of Classification Search
  USPC ................ 709/202–203, 217–219; 707/610, 707/638–639
  See application file for complete search history.

(56) References Cited

U.S. PATENT DOCUMENTS

| | | | |
|---|---|---|---|
| 5,933,598 A | 8/1999 | Scales et al. | |
| 6,012,032 A | 1/2000 | Donovan et al. | |
| 6,085,333 A | 7/2000 | DeKoning et al. | |
| 6,643,641 B1 | 11/2003 | Snyder | |
| 6,647,514 B1 | 11/2003 | Umberger et al. | |
| 6,789,162 B1 | 9/2004 | Talagala et al. | |
| 7,089,272 B1 | 8/2006 | Garthwaite et al. | |
| 7,107,389 B2 | 9/2006 | Inagaki et al. | |
| 7,146,521 B1 | 12/2006 | Nguyen | |
| 7,334,124 B2 | 2/2008 | Pham et al. | |
| 7,437,530 B1 | 10/2008 | Rajan | |
| 7,493,424 B1 | 2/2009 | Bali et al. | |
| 7,669,029 B1 | 2/2010 | Mishra et al. | |
| 7,689,609 B2 | 3/2010 | Lango et al. | |
| 7,743,191 B1 | 6/2010 | Liao | |
| 7,899,780 B1 | 3/2011 | Shmuylovich et al. | |
| 8,042,163 B1 | 10/2011 | Karr et al. | |
| 8,086,585 B1 | 12/2011 | Brashers et al. | |
| 8,271,700 B1 | 9/2012 | Annem et al. | |
| 8,341,117 B2 * | 12/2012 | Ram | G06F 11/1453 707/638 |
| 8,387,136 B2 | 2/2013 | Lee et al. | |
| 8,437,189 B1 | 5/2013 | Montierth et al. | |
| 8,465,332 B2 | 6/2013 | Hogan et al. | |
| 8,527,544 B1 | 9/2013 | Colgrove et al. | |
| 8,566,546 B1 | 10/2013 | Marshak et al. | |
| 8,578,442 B1 | 11/2013 | Banerjee | |
| 8,613,066 B1 | 12/2013 | Brezinski et al. | |
| 8,620,970 B2 | 12/2013 | English et al. | |
| 8,751,463 B1 | 6/2014 | Chamness | |
| 8,762,642 B2 | 6/2014 | Bates et al. | |
| 8,769,622 B2 | 7/2014 | Chang et al. | |
| 8,800,009 B1 | 8/2014 | Beda, III et al. | |
| 8,812,860 B1 | 8/2014 | Bray | |
| 8,850,546 B1 | 9/2014 | Field et al. | |
| 8,898,346 B1 | 11/2014 | Simmons | |
| 8,909,854 B2 | 12/2014 | Yamagishi et al. | |
| 8,931,041 B1 | 1/2015 | Banerjee | |
| 8,949,863 B1 | 2/2015 | Coatney et al. | |
| 8,984,602 B1 | 3/2015 | Bailey et al. | |
| 8,990,905 B1 | 3/2015 | Bailey et al. | |
| 9,124,569 B2 | 9/2015 | Hussain et al. | |
| 9,134,922 B2 | 9/2015 | Rajagopal et al. | |
| 9,209,973 B2 | 12/2015 | Aikas et al. | |
| 9,250,823 B1 | 2/2016 | Kamat et al. | |
| 9,300,660 B1 | 3/2016 | Borowiec et al. | |
| 9,444,822 B1 | 9/2016 | Borowiec et al. | |
| 9,507,532 B1 | 11/2016 | Colgrove et al. | |
| 9,912,748 B2 * | 3/2018 | Lazar | H04L 67/1095 |
| 2002/0013802 A1 | 1/2002 | Mori et al. | |
| 2003/0145172 A1 | 7/2003 | Galbraith et al. | |
| 2003/0191783 A1 | 10/2003 | Wolczko et al. | |
| 2003/0195903 A1 | 10/2003 | Manley et al. | |
| 2003/0225961 A1 | 12/2003 | Chow et al. | |
| 2004/0080985 A1 | 4/2004 | Chang et al. | |
| 2004/0111573 A1 | 6/2004 | Garthwaite | |
| 2004/0153844 A1 | 8/2004 | Ghose et al. | |
| 2004/0193814 A1 | 9/2004 | Erickson et al. | |
| 2004/0260967 A1 | 12/2004 | Guha et al. | |
| 2005/0160416 A1 | 7/2005 | Jamison | |
| 2005/0188246 A1 | 8/2005 | Emberty et al. | |
| 2005/0216800 A1 | 9/2005 | Bicknell et al. | |
| 2006/0015771 A1 | 1/2006 | Vana Gundy et al. | |
| 2006/0129817 A1 | 6/2006 | Borneman et al. | |
| 2006/0161726 A1 | 7/2006 | Lasser | |
| 2006/0230245 A1 | 10/2006 | Gounares et al. | |
| 2006/0239075 A1 | 10/2006 | Williams et al. | |
| 2007/0022227 A1 | 1/2007 | Miki | |
| 2007/0028068 A1 | 2/2007 | Golding et al. | |
| 2007/0055702 A1 | 3/2007 | Fridella et al. | |
| 2007/0094466 A1 | 4/2007 | Sharma et al. | |
| 2007/0109856 A1 | 5/2007 | Pellicone et al. | |
| 2007/0150689 A1 | 6/2007 | Pandit et al. | |
| 2007/0168321 A1 | 7/2007 | Saito et al. | |
| 2007/0220227 A1 | 9/2007 | Long | |
| 2007/0294563 A1 | 12/2007 | Bose | |
| 2007/0294564 A1 | 12/2007 | Reddin et al. | |
| 2008/0005587 A1 | 1/2008 | Ahlquist | |
| 2008/0077825 A1 | 3/2008 | Bello et al. | |
| 2008/0162674 A1 | 7/2008 | Dahiya | |
| 2008/0195833 A1 | 8/2008 | Park | |
| 2008/0270678 A1 | 10/2008 | Cornwell et al. | |
| 2008/0282045 A1 | 11/2008 | Biswas et al. | |
| 2009/0077340 A1 | 3/2009 | Johnson et al. | |
| 2009/0100115 A1 | 4/2009 | Park et al. | |
| 2009/0198889 A1 | 8/2009 | Ito et al. | |
| 2010/0052625 A1 | 3/2010 | Cagno et al. | |
| 2010/0211723 A1 | 8/2010 | Mukaida | |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0325345 A1 | 12/2010 | Ohno et al. | |
| 2010/0332754 A1 | 12/2010 | Lai et al. | |
| 2011/0072290 A1 | 3/2011 | Davis et al. | |
| 2011/0125955 A1 | 5/2011 | Chen | |
| 2011/0131231 A1 | 6/2011 | Haas et al. | |
| 2011/0167221 A1 | 7/2011 | Pangal et al. | |
| 2012/0023144 A1 | 1/2012 | Rub | |
| 2012/0054264 A1 | 3/2012 | Haugh et al. | |
| 2012/0079318 A1 | 3/2012 | Colgrove et al. | |
| 2012/0131253 A1 | 5/2012 | McKnight et al. | |
| 2012/0136832 A1 * | 5/2012 | Sadhwani | G06F 11/1469 707/640 |
| 2012/0246264 A1 * | 9/2012 | Bodorik | H04L 67/02 709/217 |
| 2012/0303919 A1 | 11/2012 | Hu et al. | |
| 2012/0311000 A1 | 12/2012 | Post et al. | |
| 2013/0007845 A1 | 1/2013 | Chang et al. | |
| 2013/0031414 A1 | 1/2013 | Dhuse et al. | |
| 2013/0036272 A1 | 2/2013 | Nelson | |
| 2013/0071087 A1 | 3/2013 | Motiwala et al. | |
| 2013/0145447 A1 | 6/2013 | Maron | |
| 2013/0191555 A1 | 7/2013 | Liu | |
| 2013/0198459 A1 | 8/2013 | Joshi et al. | |
| 2013/0205173 A1 | 8/2013 | Yoneda | |
| 2013/0219164 A1 | 8/2013 | Hamid | |
| 2013/0227201 A1 | 8/2013 | Talagala et al. | |
| 2013/0290607 A1 | 10/2013 | Chang et al. | |
| 2013/0311434 A1 | 11/2013 | Jones | |
| 2013/0318297 A1 | 11/2013 | Jibbe et al. | |
| 2013/0332614 A1 | 12/2013 | Brunk et al. | |
| 2014/0020083 A1 | 1/2014 | Fetik | |
| 2014/0074850 A1 | 3/2014 | Noel et al. | |
| 2014/0082715 A1 | 3/2014 | Grajek et al. | |
| 2014/0086146 A1 | 3/2014 | Kim et al. | |
| 2014/0090009 A1 | 3/2014 | Li et al. | |
| 2014/0096220 A1 | 4/2014 | Da Cruz Pinto et al. | |
| 2014/0101434 A1 | 4/2014 | Senthurpandi et al. | |
| 2014/0164774 A1 | 6/2014 | Nord et al. | |
| 2014/0173232 A1 | 6/2014 | Reohr et al. | |
| 2014/0195636 A1 | 7/2014 | Karve et al. | |
| 2014/0201512 A1 | 7/2014 | Seethaler et al. | |
| 2014/0201541 A1 | 7/2014 | Paul et al. | |
| 2014/0208155 A1 | 7/2014 | Pan | |
| 2014/0215590 A1 | 7/2014 | Brand | |
| 2014/0229654 A1 | 8/2014 | Goss et al. | |
| 2014/0230017 A1 | 8/2014 | Saib | |
| 2014/0258526 A1 | 9/2014 | Le Sant et al. | |
| 2014/0282983 A1 | 9/2014 | Ju et al. | |

(56) References Cited

U.S. PATENT DOCUMENTS

| | | | |
|---|---|---|---|
| 2014/0285917 | A1 | 9/2014 | Cudak et al. |
| 2014/0325262 | A1 | 10/2014 | Cooper et al. |
| 2014/0351627 | A1 | 11/2014 | Best et al. |
| 2014/0373104 | A1 | 12/2014 | Gaddam et al. |
| 2014/0373126 | A1 | 12/2014 | Hussain et al. |
| 2015/0026387 | A1 | 1/2015 | Sheredy et al. |
| 2015/0074463 | A1 | 3/2015 | Jacoby et al. |
| 2015/0089569 | A1 | 3/2015 | Sondhi et al. |
| 2015/0095515 | A1 | 4/2015 | Krithivas et al. |
| 2015/0113203 | A1 | 4/2015 | Dancho et al. |
| 2015/0121137 | A1 | 4/2015 | McKnight et al. |
| 2015/0134920 | A1 | 5/2015 | Anderson et al. |
| 2015/0134929 | A1 | 5/2015 | Anderson et al. |
| 2015/0149822 | A1 | 5/2015 | Coronado et al. |
| 2015/0193169 | A1 | 7/2015 | Sundaram et al. |
| 2015/0347548 | A1* | 12/2015 | Mortensen .......... G06F 11/1451 707/639 |
| 2015/0378888 | A1 | 12/2015 | Zhang et al. |
| 2016/0098323 | A1 | 4/2016 | Mutha et al. |
| 2016/0292253 | A1* | 10/2016 | Akirav ................ G06F 11/1464 |
| 2016/0350009 | A1 | 12/2016 | Cerreta et al. |
| 2016/0352720 | A1 | 12/2016 | Hu et al. |
| 2016/0352830 | A1 | 12/2016 | Borowiec et al. |
| 2016/0352834 | A1 | 12/2016 | Borowiec et al. |
| 2017/0091057 | A1* | 3/2017 | Ramasubramaniam ..................... G06F 11/2082 |

FOREIGN PATENT DOCUMENTS

| | | |
|---|---|---|
| WO | WO2013071087 A1 | 5/2013 |
| WO | WO 2014/110137 A1 | 7/2014 |
| WO | WO 2016/015008 A1 | 12/2016 |
| WO | WO 2016/190938 A1 | 12/2016 |
| WO | WO 2016/195759 A1 | 12/2016 |
| WO | WO 2016/195958 A1 | 12/2016 |
| WO | WO 2016/195961 A1 | 12/2016 |

OTHER PUBLICATIONS

PCMag. "Storage Array Definition". Published May 10, 2013. <http://web.archive.org/web/20130510121646/http://www.pcmag.com/encyclopedia/term/52091/storage-array>, 2 pages.
Google Search of "storage array define" performed by the Examiner on Nov. 4, 2015 for U.S. Appl. No. 14/725,278, Results limited to entries dated before 2012, 1 page.
Techopedia. "What is a disk array". Published Jan. 13, 2012. <http://web.archive.org/web/20120113053358/http://www.techopedia.com/definition/1009/disk-array>, 1 page.
Webopedia. "What is a disk array". Published May 26, 2011. <http://web.archive.org/web/20110526081214/http://www,webopedia.com/TERM/D/disk_array.html>, 2 pages.
Li et al., *Access Control for the Services Oriented Architecture*, Proceedings of the 2007 ACM Workshop on Secure Web Services (SWS '07), Nov. 2007, pp. 9-17, ACM New York, NY.
The International Serach Report and the Written Opinoin received from the International Searching Authority (ISA/EPO) for International Application No. PCT/US2016/015006, dated Apr. 29, 2016, 12 pages.
The International Serach Report and the Written Opinoin received from the International Searching Authority (ISA/EPO) for International Application No. PCT/US2016/015008, dated May 4, 2016, 12 pages.
C. Hota et al., *Capability-based Cryptographic Data Access Controlin Cloud Computing*, Int. J. Advanced Networking and Applications, Colume 1, Issue 1, dated Aug. 2011, 10 pages.
The International Search Report and the Written Opinion received from the International Searching Authority (ISA/EPO) for International Application No. PCT/US2016/020410, dated Jul. 8, 2016, 17 pages.
The International Search Report and the Written Opinion received from the International Searching Authority (ISA/EPO) for International Application No. PCT/US2016/032084, dated Jul. 18, 2016, 12 pages.
Faith, "dictzip file format", GitHub.com (online). [accessed Jul. 28, 2015], 1 page, URL: https://github.com/fidlej/idzip.
Wikipedia, "Convergent Encryption", Wikipedia.org (online), accessed Sep. 8, 2015, 2 pages, URL: en.wikipedia.org/wiki/Convergent_encryption.
Storer et al., "Secure Data Deduplication", Proceedings of 4th ACM International Workshop on Storage Security And Survivability (StorageSS'08), Oct. 2008, 10 pages, ACM New York, NY. USA. DOI: 10.1145/1456469.1456471.
The International Serach Report and the Written Opinoin received from the International Searching Authority (ISA/EPO) for International Application No. PCT/US2016/016333, dated Jun. 8, 2016, 12 pages.
ETSI, *Network Function Virtualisation (NFV); Resiliency Requirements*, ETSI GS NFCV-REL 001, V1.1.1, http://www.etsi.org/deliver/etsi_gs/NFV-REL/001_099/001/01.01.01_60/gs_NFV-REL001v010101p.pdf (online), dated Jan. 2015, 82 pages.
The International Search Report and the Written Opinoin received from the International Searching Authority (ISA/EPO) for International Application No. PCT/US2016/032052, dated Aug. 30, 2016, 17 pages.
Microsoft, "Hybrid for SharePoint Server 2013—Security Reference Architecture", <http://hybrid.office.com/img/Security_Reference_Architecture.pdf> (online), dated Oct. 2014, 53 pages.
Microsoft, "Hybrid Identity", <http://aka.ms/HybridIdentityWp> (online), dated Apr. 2014, 36 pages.
Microsoft, "Hybrid Identity Management", <http://download.microsoft.com/download/E/A/E/EAE57CD1-A80B-423C-96BB-142FAAC630B9/Hybrid_Identity_Datasheet.pdf> (online), published Apr. 2014, 17 pages.
Jacob Bellamy-McIntyre et al., "OpenID and the EnterpriseL A Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.
The International Search Report and the Written Opinoin received from the International Searching Authority (ISA/EPO) for International Application No. PCT/US2016/035492, dated Aug. 17, 2016, 10 pages.
International Search Report and Written Opinion, PCT/US2016/059720, dated Jan. 19, 2017, 12 pages.
The International Search Report and the Written Opinion received from the International Searching Authority (ISA/EPO) for International Application No. PCT/US2016/036693, dated Aug. 29, 2016, 10 pages.
The International Search Report and the Written Opinion received from the International Searching Authority (ISA/EP) for International Application No. PCT/US2016/038758, dated Oct. 7, 2016, 10 pages.
The International Search Report and the Written Opinion received from the International Searching Authority (ISA/EP) for International Application No. PCT/US2016/040393, dated Sep. 22, 2016, 10 pages.
The International Search Report and the Written Opinion received from the International Searching Authority (ISA/EP) for International Application No. PCT/US2016/044020, dated Sep. 30, 2016, 11 pages.
Kwok Kong, *Using PCI Express as the Primary System Interconnect in Multiroot Compute, Storage, Communications and Embedded Systems*, IDT, White Paper, <http://www.idt.com/document/whp/idt-pcie-multi-root-white-paper>, retrieved by WIPO Dec. 4, 2014, dated Aug. 28, 2008, 12 pages.
The International Search Report and the Written Opinion received from the International Searching Authority (ISA/EP) for International Application No. PCT/US2016/044874, dated Oct. 7, 2016, 11 pages.

(56) References Cited

OTHER PUBLICATIONS

The International Search Report and the Written Opinion received from the International Searching Authority (ISA/EP) for International Application No. PCT/US2016/044875, dated Oct. 5, 2016, 13 pages.

The International Search Report and the Written Opinion received from the International Searching Authority (ISA/EP) for International Application No. PCT/US2016/044876, dated Oct. 21, 2016, 12 pages.

The International Search Report and the Written Opinion received from the International Searching Authority (ISA/EP) for International Application No. PCT/US2016/044877, dated Sep. 29, 2016, 13 pages.

Xiao-Yu Hu et al., *Container Marking: Combining Data Placement, Garbage Collection and Wear Levelling for Flash*, 19th Annual IEEE International Symposium on Modelling, Analysis, and Simulation of Computer and Telecommunications Systems, ISBN: 978-0-7695-4430-4, DOI: 10.1109/MASCOTS.2011.50, dated Jul. 25-27, 2011, 11 pages.

\* cited by examiner

PARTIALLY REPLICATING A SNAPSHOT BETWEEN STORAGE SYSTEMS

BACKGROUND OF THE INVENTION

Field of the Invention

The field of the invention is data processing, or, more specifically, methods, apparatus, and products for synchronizing snapshots between storage systems.

Description of Related Art

Enterprise storage systems can include a large number of storage devices that collectively form a single storage system. Snapshots may be taken of some portion of the storage system to represent the state of the portion of the storage system at a particular point in time. Storing such snapshots within the storage system itself, however, can consume valuable storage that may be better utilized for other purposes.

SUMMARY OF THE INVENTION

Methods, apparatuses, and products for synchronizing snapshots between storage systems, including: receiving, from a source storage system, an identification of a snapshot to be replicated to a destination storage system, wherein the source storage system and the destination storage system are of different types; identifying, from hint information stored on the destination storage system, a most recent version of the snapshot that is stored on the destination storage system; issuing, to the source storage system, a request for an identification of the differences between the snapshot to be replicated to the destination storage system and the most recent version of the snapshot that is stored on the destination storage system; receiving, from the source storage system, the identification of the differences; and issuing a request to transfer, from the source storage system to the destination storage system, data associated with the differences.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
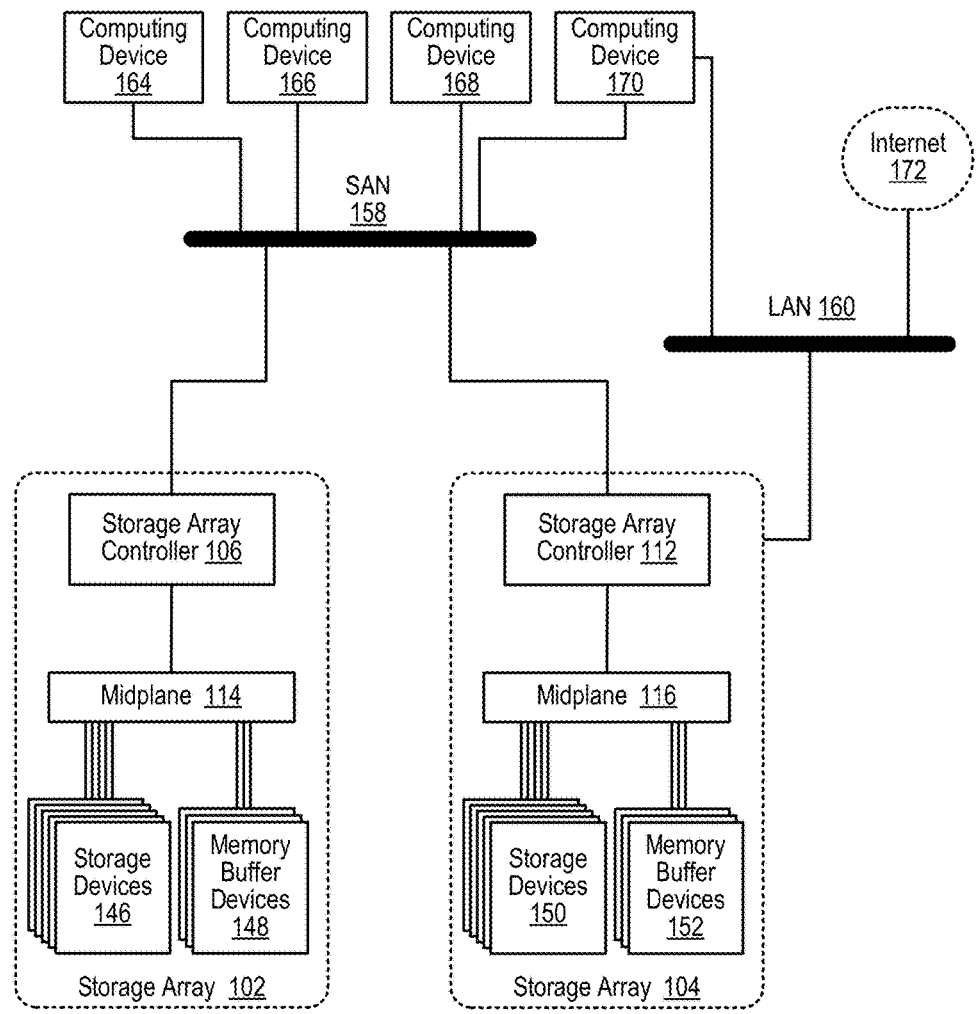
FIG. 1 sets forth a block diagram of a system in which snapshots may be synchronized according to embodiments of the present disclosure.

Example methods, apparatus, and products for synchronizing snapshots between storage systems in accordance with the present invention are described with reference to the accompanying drawings, beginning with FIG. 1. FIG. 1 sets forth a block diagram of a system in which snapshots may be synchronized according to embodiments of the present disclosure. The system of FIG. 1 includes a number of computing devices (164, 166, 168, 170). The computing devices (164, 166, 168, 170) depicted in FIG. 1 may be implemented in a number of different ways. For example, the computing devices (164, 166, 168, 170) depicted in FIG. 1 may be embodied as a server in a data center, a workstation, a personal computer, a notebook, or the like.

The computing devices (164, 166, 168, 170) in the example of FIG. 1 are coupled for data communications to a number of storage arrays (102, 104) through a storage area network (SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art.

The example storage arrays (102, 104) of FIG. 1 provide persistent data storage for the computing devices (164, 166, 168, 170). The example storage arrays (102, 104) of FIG. 1 may provide persistent data storage for the computing devices (164, 166, 168, 170), at least in part, through the use of a plurality of storage devices (146, 150). A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114) to a number of storage devices (146, 150). Readers will appreciate that although the example depicted in FIG. 1 includes an embodiment where the storage array controller (106, 112) is communicatively coupled the storage devices (146, 150) via a midplane (114), other forms of interconnects may be utilized to facilitate communications between the storage array controller (106, 112) and the storage devices (146, 150).

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Synchronizing snapshots between storage systems in accordance with embodiments of the present disclosure is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in synchronizing snapshots between storage systems according to embodiments of the present disclosure.

Figure 2:
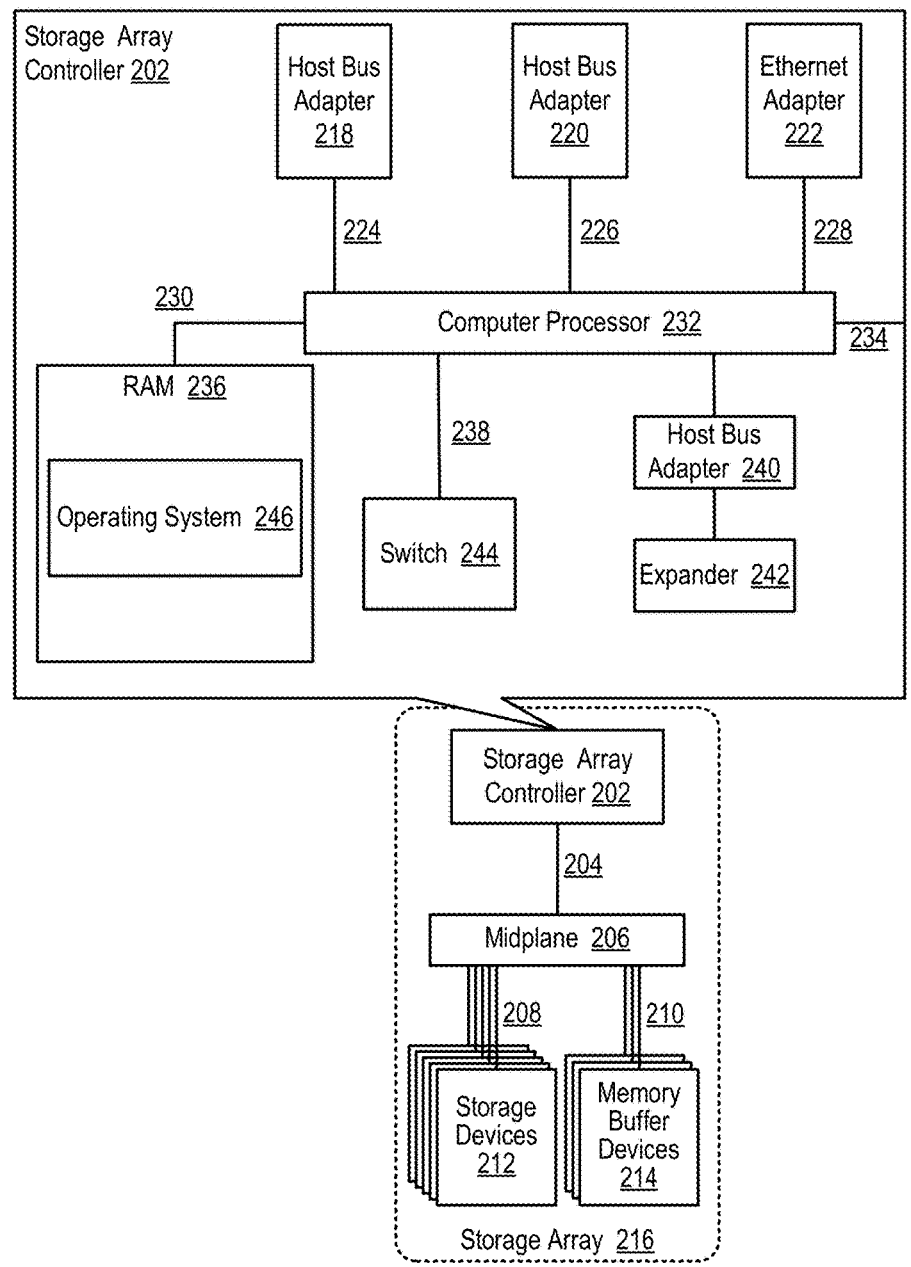
FIG. 2 sets forth a block diagram of a storage array controller useful in synchronizing snapshots between storage systems according to embodiments of the present disclosure.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for synchronizing snapshots between storage systems according to embodiments of the present disclosure include UNIX™, Linux™, Microsoft Windows™, and others as will occur to those of skill in the art. Readers will appreciate that while the operating system (246) in the example of FIG. 2 is shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
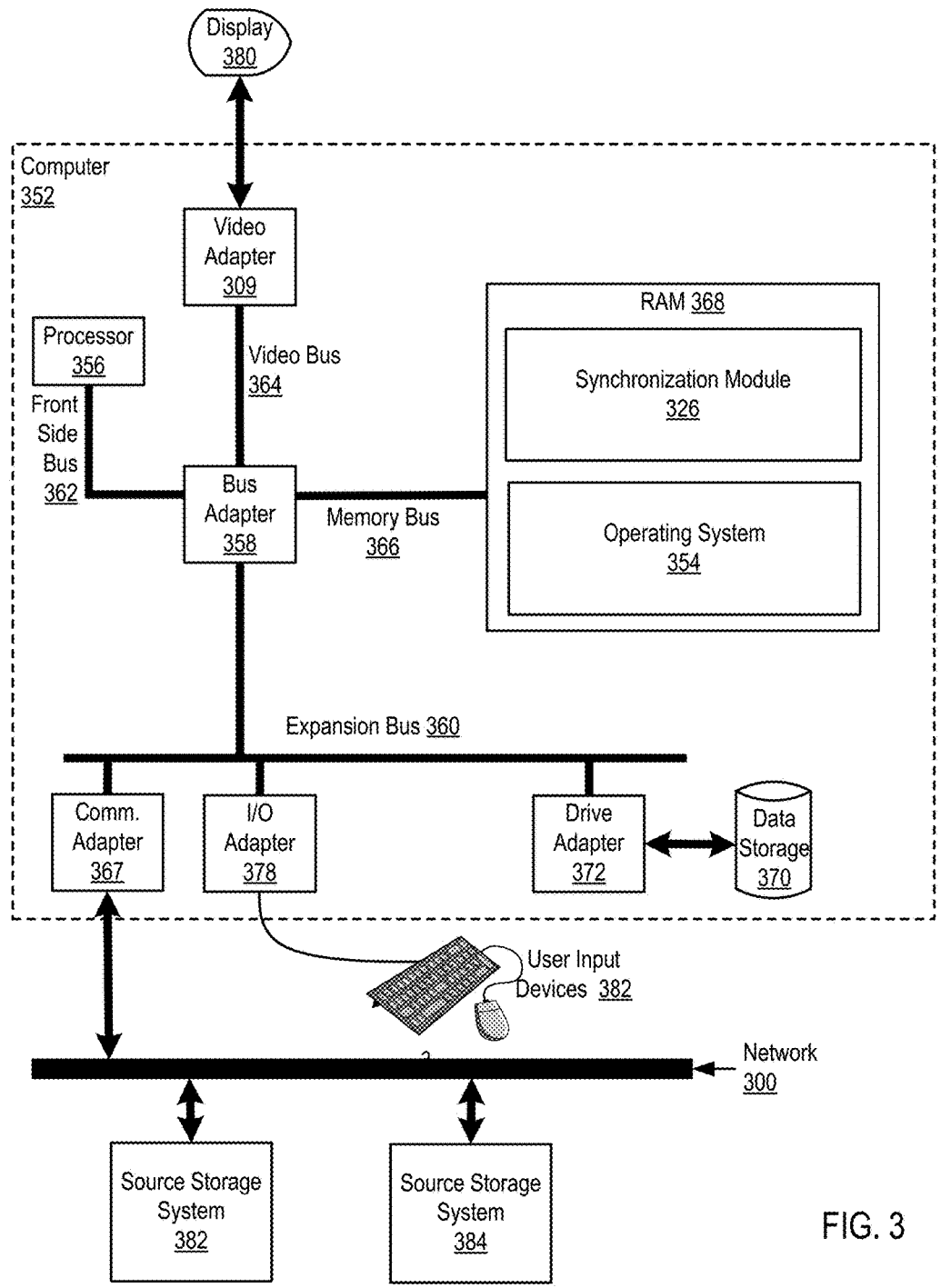
FIG. 3 sets forth a block diagram of automated computing machinery comprising an example computer useful in synchronizing snapshots between storage systems according to embodiments of the present disclosure.

For further explanation, FIG. 3 sets forth a block diagram of automated computing machinery comprising an example computer (352) useful in synchronizing snapshots between storage systems according to embodiments of the present disclosure. The computer (352) of FIG. 3 includes at least one computer processor (356) or "CPU" as well as random access memory ("RAM") (368) which is connected through a high speed memory bus (366) and bus adapter (358) to processor (356) and to other components of the computer (352). Stored in RAM (368) is a synchronization module (326), a module of computer program instructions for synchronizing snapshots between storage systems according to embodiments of the present disclosure.

The synchronization module (326) may be configured for synchronizing snapshots between storage systems (382, 384) by: receiving, from a source storage system, an identification of a snapshot to be replicated to a destination storage system, wherein the source storage system and the destination storage system are of different types;

identifying, from hint information stored on the destination storage system, a most recent version of the snapshot that is stored on the destination storage system; issuing, to the source storage system, a request for an identification of the differences between the snapshot to be replicated to the destination storage system and the most recent version of the snapshot that is stored on the destination storage system; receiving, from the source storage system, the identification of the differences; and issuing a request to transfer, from the source storage system to the destination storage system, data associated with the differences, as described in more detail below.

Also stored in RAM (368) is an operating system (354). Operating systems useful in computers configured for synchronizing snapshots between storage systems according to embodiments described herein include UNIX™, Linux™, Microsoft XP™, AIX™, IBM's i5/OS™, and others as will occur to those of skill in the art. The operating system (354), and synchronization module (326) in the example of FIG. 3 are shown in RAM (368), but many components of such software typically are stored in non-volatile memory also, such as, for example, on a disk drive (370).

The example computer (352) of FIG. 3 also includes disk drive adapter (372) coupled through expansion bus (360) and bus adapter (358) to processor (356) and other components of the computer (352). Disk drive adapter (372) connects non-volatile data storage to the computer (352) in the form of disk drive (370). Disk drive adapters useful in computers configured for synchronizing snapshots between storage systems according to embodiments described herein include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computer (352) of FIG. 3 includes one or more input/output ("I/O") adapters (378). I/O adapters implement user-oriented input/output through, for example, software drivers and computer hardware for controlling output to display devices such as computer display screens, as well as user input from user input devices (181) such as keyboards and mice. The example computer (352) of FIG. 3 includes a video adapter (309), which is an example of an I/O adapter specially designed for graphic output to a display device (380) such as a display screen or computer monitor. Video adapter (309) is connected to processor (356) through a high speed video bus (164), bus adapter (358), and the front side bus (362), which is also a high speed bus.

The example computer (352) of FIG. 3 includes a communications adapter (367) for data communications with other computers and for data communications with a data communications network (300). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for synchronizing snapshots between storage systems according to embodiments described herein include modems for wired dial-up communications, Ethernet (IEEE 802.3) adapters for wired data communications, and 802.11 adapters for wireless data communications.

Figure 4:
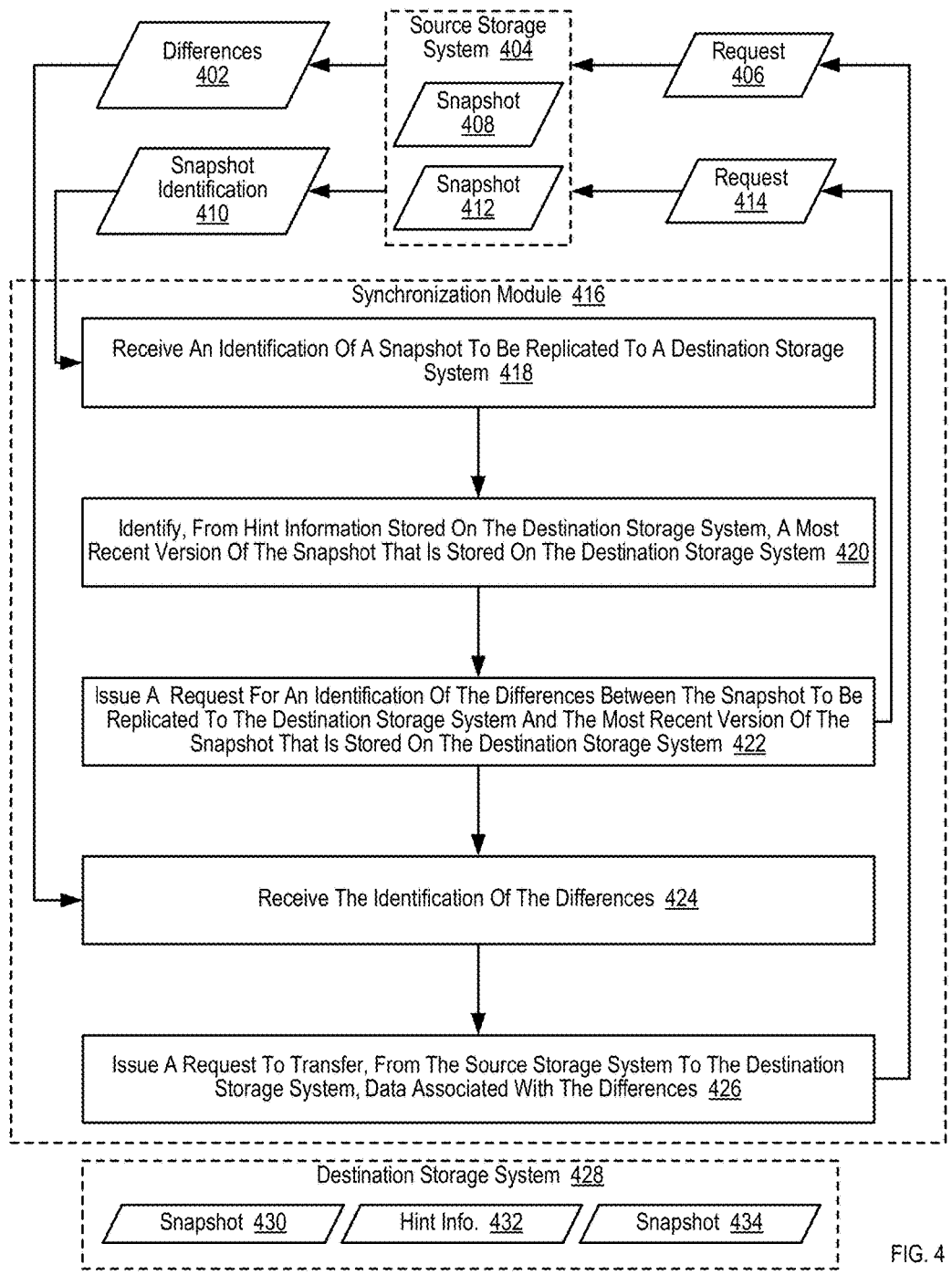
FIG. 4 sets forth a flow chart illustrating an example method for synchronizing snapshots between storage systems according to embodiments of the present disclosure.

For further explanation, FIG. 4 sets forth a flow chart illustrating an example method for synchronizing snapshots between storage systems (404, 428) according to embodiments of the present disclosure. Each of the storage systems (404, 428) of FIG. 4 may be embodied, for example, as a storage array that includes a plurality of SSDs, as a storage array that includes a plurality of HDDs, as a cloud-based storage system, and so on. Each of the storage systems (404, 428) depicted in FIG. 4 are also of different types. For example, the source storage system (404) may adhere to a first storage architecture and the destination storage system (428) may adhere to a second storage architecture. Each storage architecture may specify, for example, the types of storage devices that are included within the storage system, the manner in which the storage system and is attached to host systems, information describing the interfaces exposed by the storage devices within a particular storage system, and so on.

The example method depicted in FIG. 4 is carried out, at least in part, by a synchronization module (416). The synchronization module (416) depicted in FIG. 4 may be embodied, for example, as a module of computer program instructions executing on computer hardware such as a computer processor. The synchronization module (416) may even be supported by a virtual machine that is executing on a server or other computing device coupled, directly or indirectly, for data communications with each of the storage systems (404, 428).

The example method depicted in FIG. 4 includes receiving (418), from a source storage system (404), an identification (410) of a snapshot (408, 412) to be replicated to a destination storage system (428). In the example method depicted in FIG. 4, snapshots of the source storage system (404) may be replicated to the destination storage system (428) because the destination storage system (428) serves as a backup of the source storage system (404). For example, if the source storage system (404) fails, the snapshots of the source storage system (404) that have been replicated to the destination storage system (428) may be retrieved from the destination storage system (428) so that the contents of the source storage system (404) can be rebuilt on the source storage system (404) or on a replacement storage system (not shown).

Each of the snapshots (408, 412) stored on the source storage system (404) can represent the state of the source storage system (404) at a particular point in time when the snapshot was taken. In the example method depicted in FIG. 4, many of the individual snapshots (408, 412) can include only information that has changed since a previous snapshot was taken, so that the entire contents of the source storage system (404) need not be included in each snapshot. For example, the first snapshot taken of the source storage system (404) can include a copy of the entire storage system, the second snapshot taken of the source storage system (404) can include only data in the source storage system (404) that has changed since the first snapshot was taken, the third snapshot taken of the source storage system (404) can include only data in the source storage system (404) that has changed since the second snapshot was taken, and so on. In such a way, the size of each snapshot can be reduced by avoiding the inclusion of data that is also included in another snapshot. Readers will appreciate that additional measures may also be taken to reduce the size of each snapshot such as, for example, deduplicating the data in each snapshot, compressing each snapshot, and so on.

In the example method depicted in FIG. 4, the identification (410) of a snapshot (408, 412) to be replicated to the destination storage system (428) may be embodied as any unique identifier that distinguishes a particular snapshot from all other snapshots stored in the source storage system (404). For example, the identification (410) of a snapshot (408, 412) to be replicated may be embodied as a time and date stamp that identifies the time and date that the snapshot was taken. Such an identification (410) of a snapshot (408, 412) may be embodied as parameter that is passed in a message from the source storage system (404) to the synchronization module (416) or, alternatively, embedded in other information (e.g., in the name of the snapshot itself) that is passed from the source storage system (404) to the synchronization module (416).

In the example method depicted in FIG. 4, a particular snapshot (408, 412) may be selected to be replicated to the destination storage system (428) for a variety of reasons and according to a variety of rules. For example, the source storage system (404) may be configured such that each time the source storage system (404) takes a new snapshot, the source storage system (404) sends a notification to the synchronization module (416) indicating that the source storage system (404) has stored a snapshot that has not been replicated to the destination storage system (428). Alternatively, the synchronization module (416) may be configured to periodically poll the source storage system (404) to determine whether the source storage system (404) has stored a snapshot that has not been replicated to the destination storage system (428). Readers will appreciate that other triggering events may occur to cause the source storage system (404), the synchronization module (416), or even the destination storage system (428) to request replication of any snapshots that are stored on the source storage system (404) that have not been replicated to the destination storage system (428).

The example method depicted in FIG. 4 also includes identifying (420), from hint information (432) stored on the destination storage system (428), a most recent version of the snapshot (430, 434) that is stored on the destination storage system (428). Many of the individual snapshots (430, 434) stored on the destination storage system (428) can include only information that has changed since a previous snapshot was taken, so that the entire contents of the source storage system (404) need not be included in each snapshot. For example, the first snapshot taken of the source storage system (404) can include a copy of the entire storage system, the second snapshot taken of the source storage system (404) can include only data in the source storage system (404) that has changed since the first snapshot was taken, the third snapshot taken of the source storage system (404) can include only data in the source storage system (404) that has changed since the second snapshot was taken, and so on. As such, the most recent version of the snapshot (430, 434) that is stored on the destination storage system (428) may be embodied as the snapshot that was taken at the most recent date and time. The most recent of the snapshot (430, 434) that is stored on the destination storage system (428) therefore represents the most up-to-date view of the source storage system (404) that is replicated onto the destination storage system (428).

In the example method depicted in FIG. 4, the most recent version of the snapshot (430, 434) that is stored on the destination storage system (428) may be identified (420) from hint information (432) that is stored on the destination storage system (428). The hint information (432) that is stored on the destination storage system (428) may be embodied, for example, as information that distinguishes a particular snapshot from all other snapshots stored on the destination storage system (428). For example, the hint information (432) may be embedded within the names of the snapshot and may include information such as an identifier of the source storage system, the date that the snapshot was taken, and the time that the snapshot was taken. In such an example, the synchronization module (416) may be configured to parse the names of each snapshot stored on the destination storage system (428) to identify the snapshot that was taken at the most recent point in time. Alternatively, the destination storage system (428) may be configured to parse the names of each snapshot stored on the destination storage system (428) to identify the snapshot that was taken at the most recent point in time, and the destination storage system (428) may be configured to communicate such information to the synchronization module (416) via one or more messages.

The example method depicted in FIG. 4 also includes issuing (422), to the source storage system (404), a request (414) for an identification of the differences between the snapshot (408, 412) to be replicated to the destination storage system (428) and the most recent version of the snapshot (430, 434) that is stored on the destination storage system (428). The request (414) for an identification of the differences between the snapshot (408, 412) to be replicated to the destination storage system (428) and the most recent version of the snapshot (430, 434) that is stored on the destination storage system (428) may be embodied, for example, as a call to a function that is executed on the source storage system (404) but exposed to registered entities such as the synchronization module (416). The request (414) that is issued (422) by the synchronization module (416) may include one or more parameters, including a parameter that identifies the most recent version of the snapshot (430, 434) that is stored on the destination storage system (428). Such a parameter may be embodied, for example, as combination of a time stamp and date stamp that identifies when the most recent snapshot (430, 434) that is stored on the destination storage system (428) was taken.

The source storage system (404) may identify the differences between the snapshot (408, 412) to be replicated to the destination storage system (428) and the most recent version of the snapshot (430, 434) that is stored on the destination storage system (428), for example, through the use of one or more functions that are available for execution on the source storage system (404). Such functions may be configured to take two snapshots as inputs and identify the differences between the two snapshots. The functions may be configured to identify the differences between each of the snapshots, for example, by creating a first volume that includes all data contained in the first snapshot, creating a second volume that includes all data contained in the second snapshot, and comparing the first volume to the second volume to identify address ranges within the first volume where the data contained in the address ranges of the first volume do not match the data contained in the same address ranges of the second volume. Readers will appreciate that the differences between the snapshot (408, 412) to be replicated to the destination storage system (428) and the most recent version of the snapshot (430, 434) that is stored on the destination storage system (428) may be identified in other ways as will occur to those of skill in the art in view of the present disclosure.

The example method depicted in FIG. 4 also includes receiving (424), from the source storage system (404), the identification of the differences (402). The identification of the differences (402) between the snapshot (408, 412) to be replicated to the destination storage system (428) and the most recent version of the snapshot (430, 434) that is stored on the destination storage system (428) may be embodied, for example, as one or more ranges of addresses on the source storage system (404) whose content has been changed since the most recent version of the snapshot (430, 434) that is stored on the destination storage system (428) was taken. Such addresses may be embodied, for example, as logical addresses that the synchronization module (416) associates with physical storage locations on the source storage system (404).

The example method depicted in FIG. 4 also includes issuing (426) a request (406) to transfer, from the source storage system (404) to the destination storage system (428), data associated with the differences (402). The request (406) to transfer data associated with the differences (402) from the source storage system (404) to the destination storage system (428) may be embodied, for example, as one or more Internet Small Computer Interface ('iSCSI') requests that are sent to the source storage system (404). Such requests may include command block descriptors ('CBD') that identify a range of addresses within the source storage system (404) where the differences (402) between the snapshot (408, 412) to be replicated to the destination storage system (428) and the most recent version of the snapshot (430, 434) that is stored on the destination storage system (428) reside, as well as information identifying the destination storage system (428) as the intended recipient of data stored at such a range of addresses. In the example method depicted in FIG. 4, the request (406) may be issued (426) by the synchronization module (416) or, in alternative embodiments, information may be sent from the synchronization module (416) to the destination storage system (428) or to the source storage system (404) that would enable either storage system (404, 428) to initiate the transfer of the data that is associated with the differences (402) between the snapshot (408, 412) to be replicated to the destination storage system (428) and the most recent version of the snapshot (430, 434) that is stored on the destination storage system (428).

Figure 5:
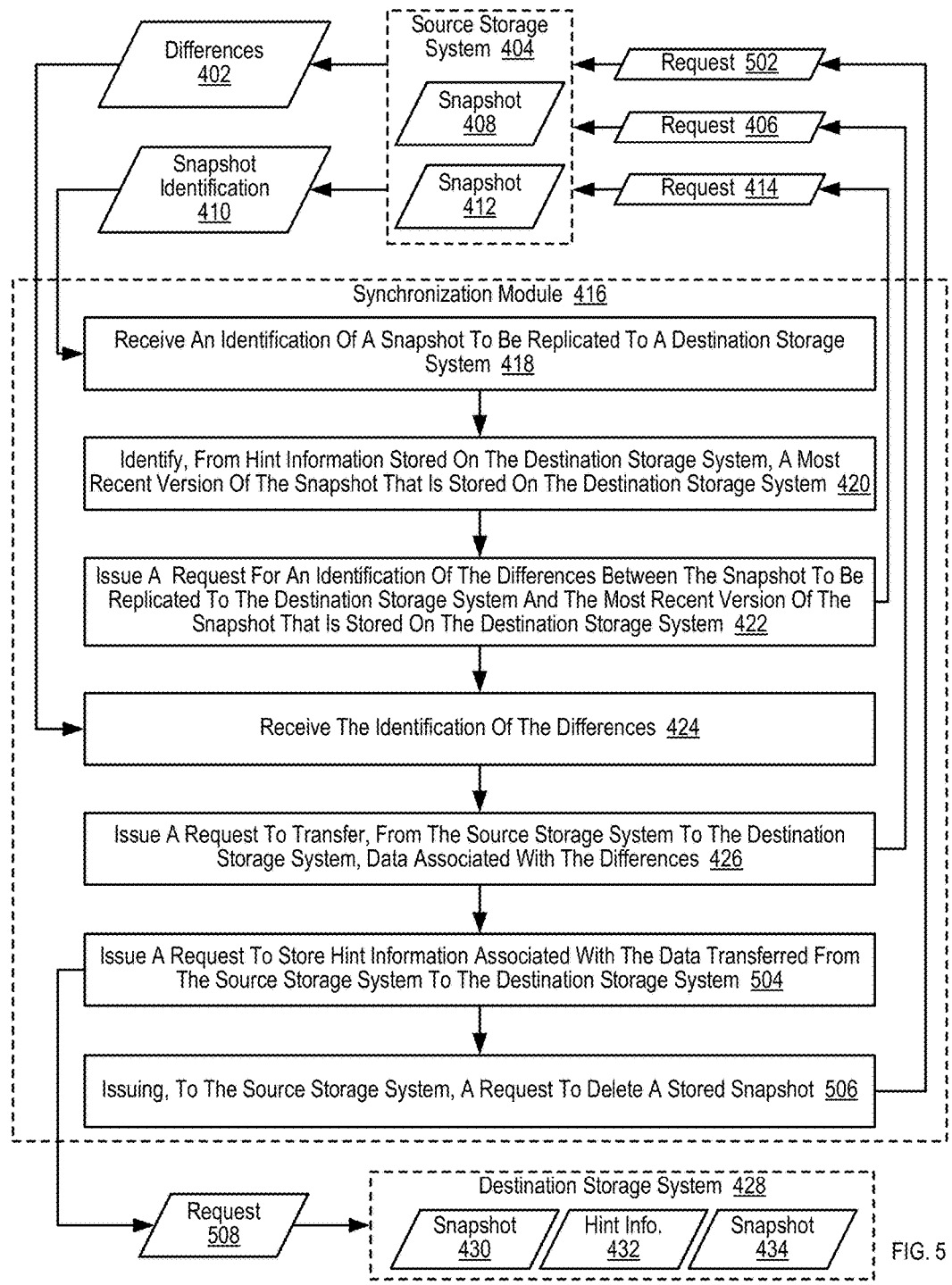
FIG. 5 sets forth a flow chart illustrating an additional example method for synchronizing snapshots between storage systems according to embodiments of the present disclosure.

For further explanation, FIG. 5 sets forth a flow chart illustrating an additional example method for synchronizing snapshots between storage systems (404, 428) according to embodiments of the present disclosure. The example method depicted in FIG. 5 is similar to the example method depicted in FIG. 4, as the example method depicted in FIG. 5 also includes receiving (418) an identification (410) of a snapshot (408, 412) to be replicated to a destination storage system (428), identifying (420) a most recent version of the snapshot (430, 434) that is stored on the destination storage system (428), issuing (422) a request (414) for an identification of the differences between the snapshot (408, 412) to be replicated to the destination storage system (428) and the most recent version of the snapshot (430, 434) that is stored on the destination storage system (428), receiving (424) the identification of the differences (402), and issuing (426) a request (406) to transfer data associated with the differences (402).

The example method depicted in FIG. 5 also includes issuing (504), to the destination storage system (428), a request (508) to store hint information (432) associated with the data transferred from the source storage system (404) to the destination storage system (428). The request (508) to store hint information (432) associated with the data transferred from the source storage system (404) to the destination storage system (428) may be embodied, for example, as a request to name each snapshot stored on the destination storage system (428) in such a way that the time at which each snapshot stored on destination storage system (428) can be identified by parsing the name of the snapshot.

Consider an example in which the source storage system (404) is configured to take a snapshot of itself every twenty-four hours. In such an example, issuing (504) the request (508) to store hint information (432) associated with the data transferred from the source storage system (404) to the destination storage system (428) may be carried out by naming each snapshot stored on the destination storage system (428) in such a way that the date at which a particular snapshot was taken is included in the name of the snapshot. For example, a snapshot taken on Jan. 1, 2016 may be named 01012016_Snapshot, a snapshot taken on Jan. 2, 2016 may be named 01022016_Snapshot, a snapshot taken on Jan. 3, 2016 may be named 01032016_Snapshot, and so on. In such an example, the hint information (432) associated with the data transferred from the source storage system (404) to the destination storage system (428) may be embedded in the name of the file that contains the data transferred from the source storage system (404) to the destination storage system (428).

The example method depicted in FIG. 5 also includes issuing (506), to the source storage system (404), a request (502) to delete a stored snapshot. The request (502) to delete a stored snapshot may be issued (506), for example, by the synchronization module (416) in response to the synchronization module (416) determining that a copy of the stored snapshot has been stored on the destination storage system (428). In alternative embodiments, the source storage system (404) may receive information (e.g., an acknowledgment from the destination storage system) indicating that the stored snapshot has been stored on the destination storage system (428), such that the source storage system (404) itself can issue (506) request (502) to delete the stored snapshot.

Consider an example in which the source storage system (404) is a relatively expensive, high performance storage system and the destination storage system (428) is a relatively cheap, low performance storage system. In such an example, assume that the source storage system (404) is configured to take a snapshot of itself every twenty-four hours. Storing each of the snapshots on the source storage system (404) itself may cause a large of amount of storage to be consumed storing each of the snapshots, and dedicating such a large amount of storage on the source storage system (404) to the retention of each of the snapshots may be a poor use of the source storage system (404), especially if a cheaper, lower performing destination storage system (428) is available. As such, once a particular snapshot has been stored on the destination storage system (428), a request (502) to delete the particular snapshot may be issued (506) to the source storage system (404), so that the source storage system (404) may dedicate a larger portion of its relatively expensive, high performance resource to more performance critical applications than retaining snapshots.

Figure 6:
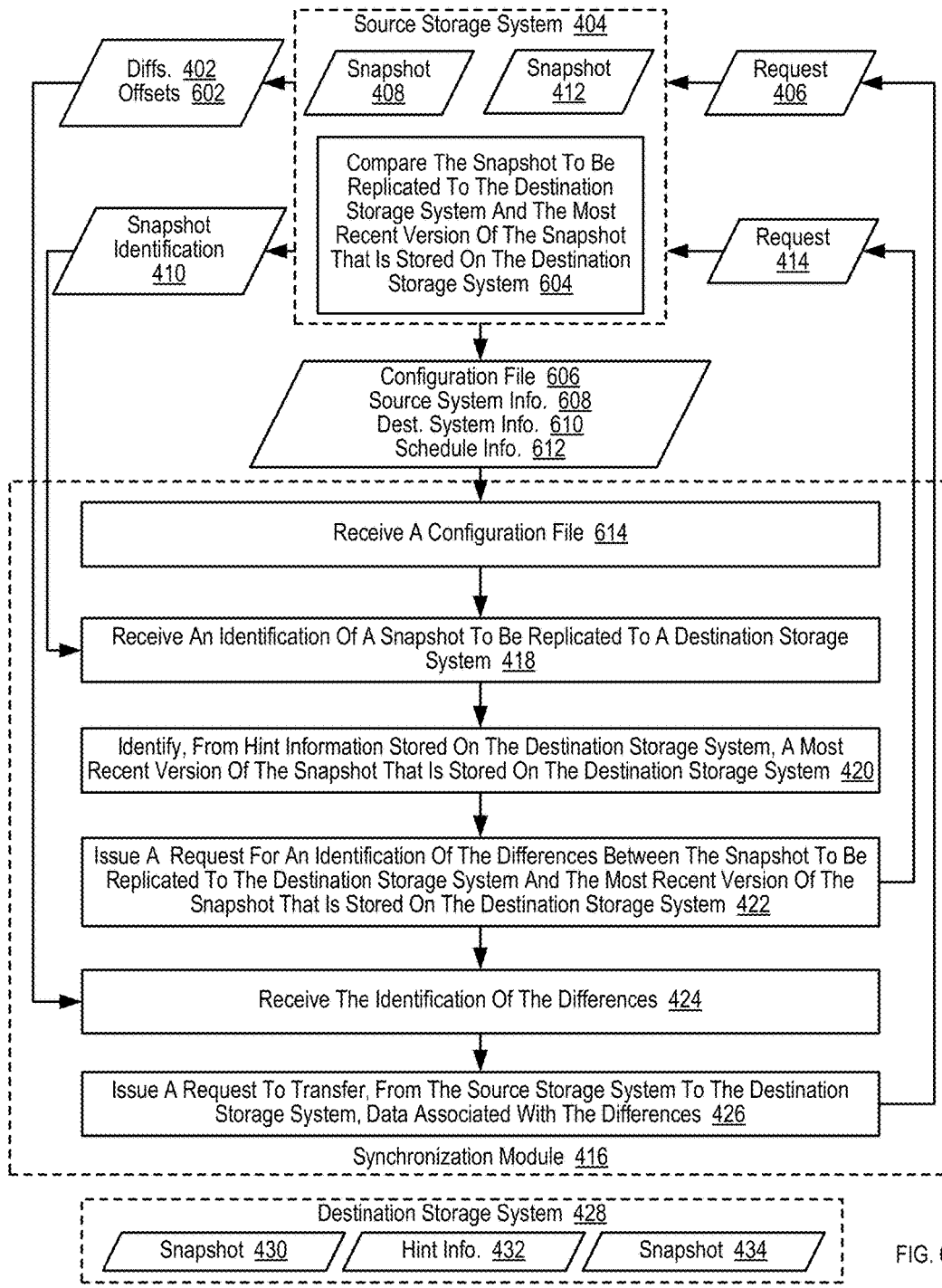
FIG. 6 sets forth a flow chart illustrating an additional example method for synchronizing snapshots between storage systems according to embodiments of the present disclosure.

For further explanation, FIG. 6 sets forth a flow chart illustrating an additional example method for synchronizing snapshots between storage systems (404, 428) according to embodiments of the present disclosure. The example method depicted in FIG. 6 is similar to the example method depicted in FIG. 4, as the example method depicted in FIG. 6 also includes receiving (418) an identification (410) of a snapshot (408, 412) to be replicated to a destination storage system (428), identifying (420) a most recent version of the snapshot (430, 434) that is stored on the destination storage system (428), issuing (422) a request (414) for an identification of the differences between the snapshot (408, 412) to be replicated to the destination storage system (428) and the most recent version of the snapshot (430, 434) that is stored on the destination storage system (428), receiving (424) the identification of the differences (402), and issuing (426) a request (406) to transfer data associated with the differences (402).

In the example method depicted in FIG. 6, the identification of the differences (402) can include offsets (602) within source storage system (404) where data is stored within the source storage system (404) that is different than data contained in the most recent version of the snapshot that is stored on the destination storage system (428). Consider the example described above where the differences between two snapshots are identified by creating a first volume that includes all data contained in the first snapshot, creating a second volume that includes all data contained in the second snapshot, and comparing the first volume to the second volume to identify address ranges within the first volume where the data contained in the address ranges of the first volume do not match the data contained in the same address ranges of the second volume. In such an example, the address ranges of the first volume whose data does not match the data contained in the same address ranges of the second volume may be expressed as offsets within the first volume, which is stored on the source storage system (404).

The example method depicted in FIG. 6 also includes comparing (604), by the source storage system (404), the snapshot to be replicated to the destination storage system (428) and the most recent version of the snapshot that is stored on the destination storage system (428). The source storage system (404) may compare (604) the snapshot to be replicated to the destination storage system (428) and the most recent version of the snapshot that is stored on the destination storage system (428), for example, through the use of one or more functions that are available for execution on the source storage system (404). Such functions may be configured to take two snapshots as inputs and identify the differences between the two snapshots. The functions may be configured to identify the differences between each of the snapshots, for example, by creating a first volume that includes all data contained in the first snapshot, creating a second volume that includes all data contained in the second snapshot, and comparing the first volume to the second volume to identify address ranges within the first volume where the data contained in the address ranges of the first volume do not match the data contained in the same address ranges of the second volume. Readers will appreciate that the differences between the snapshot (408, 412) to be replicated to the destination storage system (428) and the most recent version of the snapshot (430, 434) that is stored on the destination storage system (428) may be identified in other ways as will occur to those of skill in the art in view of the present disclosure.

The example method depicted in FIG. 6 also includes receiving (614) a configuration file (606). The configuration file (606) of FIG. 6 can include includes information (608) describing the source storage system (404), information (610) describing the destination storage system (428), and information (612) describing a schedule for synchronizing snapshots between the source storage system (404) and the destination storage system (428). The information (608) describing the source storage system (404) and the information (610) describing the destination storage system (428) can include, for example, a network address for each of the storage systems (404, 428), access credentials for each of the storage systems (404, 428), a list of volumes on the source storage system (404) whose snapshots should be copied to the destination storage system (428), retention policies for retaining snapshots on each of the storage systems (404, 428), and so on.

Figure 7:
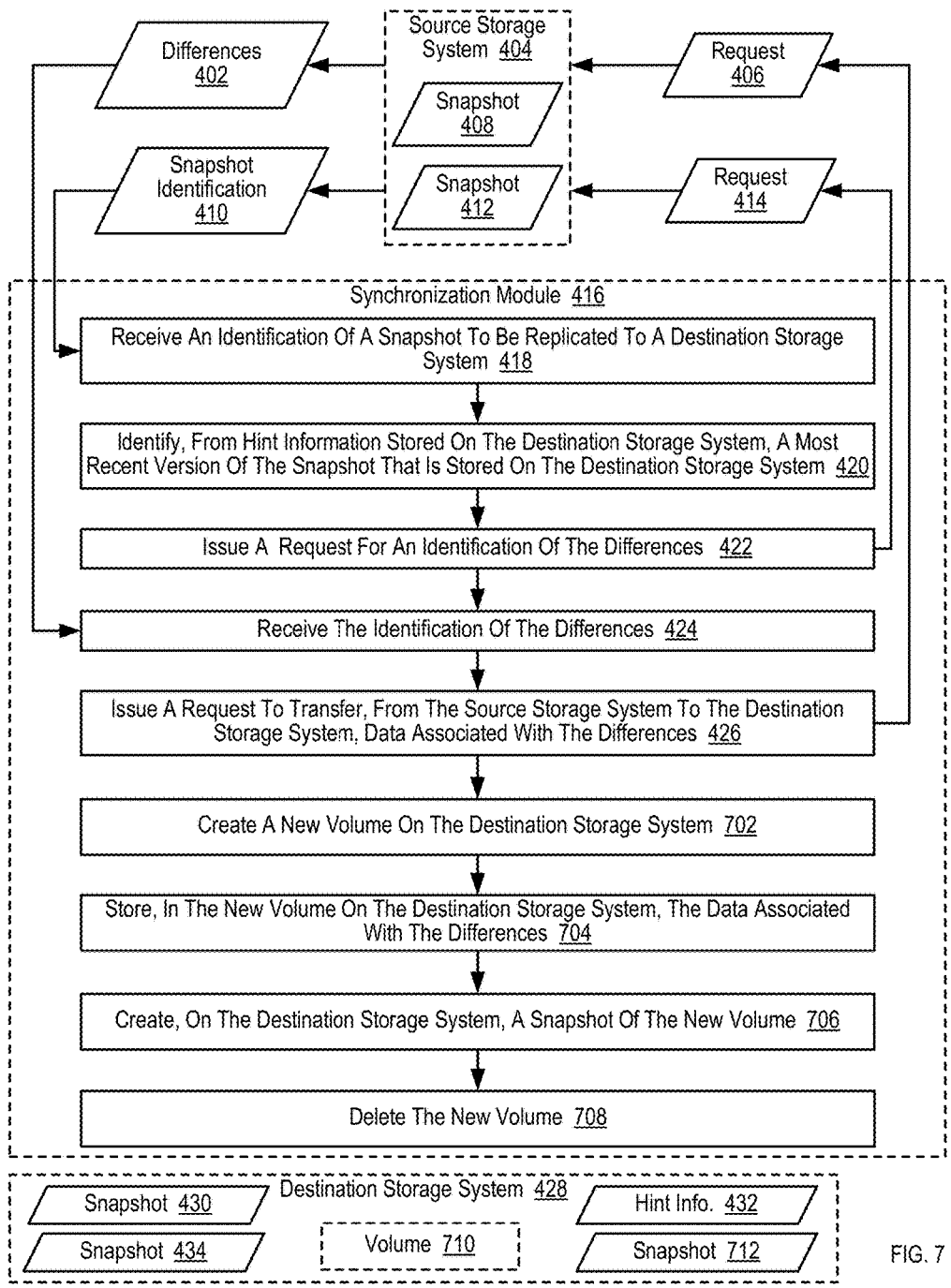
FIG. 7 sets forth a flow chart illustrating an additional example method for synchronizing snapshots between storage systems according to embodiments of the present disclosure.

For further explanation, FIG. 7 sets forth a flow chart illustrating an additional example method for synchronizing snapshots between storage systems (404, 428) according to embodiments of the present disclosure. The example method depicted in FIG. 7 is similar to the example method depicted in FIG. 4, as the example method depicted in FIG. 6 also includes receiving (418) an identification (410) of a snapshot (408, 412) to be replicated to a destination storage system (428), identifying (420) a most recent version of the snapshot (430, 434) that is stored on the destination storage system (428), issuing (422) a request (414) for an identification of the differences between the snapshot (408, 412) to be replicated to the destination storage system (428) and the most recent version of the snapshot (430, 434) that is stored on the destination storage system (428), receiving (424) the identification of the differences (402), and issuing (426) a request (406) to transfer data associated with the differences (402).

The example method depicted in FIG. 7 also includes creating (702) a new volume (710) on the destination storage system (428). The new volume (702) depicted in FIG. 7 may be embodied as a logical grouping of physical storage resources such as, for example, a logical grouping of one or more physical blocks of storage, a logical grouping of one or more physical pages of storage, a logical grouping of one or more physical address ranges of storage, and so on. In such an example, creating (702) a new volume (710) on the destination storage system (428) may be carried out by associating an identifier of the new volume (710) with the physical storage resources on the destination storage system (428) that are included in the new volume (710).

The example method depicted in FIG. 7 also includes storing (704), in the new volume (710) on the destination storage system (428), the data associated with the differences (402) between the snapshot (408, 412) to be replicated to the destination storage system (428) and the most recent version of the snapshot (430, 434) that is stored on the destination storage system (428). Storing (704) the data associated with the differences (402) between the snapshot (408, 412) to be replicated to the destination storage system (428) and the most recent version of the snapshot (430, 434) that is stored on the destination storage system (428) in the new volume (710) may be carried out, for example, by storing the data associated with the differences (402) between the snapshot (408, 412) to be replicated to the destination storage system (428) and the most recent version of the snapshot (430, 434) that is stored on the destination storage system (428) in the physical storage resources on the destination storage system (428) that are included in the new volume (710).

The example method depicted in FIG. 7 also includes creating (706), on the destination storage system (428), a snapshot (712) of the new volume (710). Readers will appreciate that in view of the fact that the new volume (710) includes the data associated with the differences (402) between the snapshot (408, 412) to be replicated to the destination storage system (428) and the most recent version of the snapshot (430, 434) that is stored on the destination storage system (428), the newly created (706) snapshot (712) will also only include the data associated with the differences (402) between the snapshot (408, 412) to be replicated to the destination storage system (428) and the most recent version of the snapshot (430, 434) that is stored on the destination storage system (428). In such a way, the amount of data included and therefore stored in each snapshot can be limited to only the changes that occurred since the last snapshot was taken.

The example method depicted in FIG. 7 also includes deleting (708) the new volume (710). In the example method depicted in FIG. 7, the new volume (710) may be deleted (708) once the snapshot (712) has been created (706). In such a way, volumes are created, a snapshot is taken of the volume, and the snapshot is deleted to effect the copying of a particular snapshot on the source storage system (404) to the destination storage system (428).

Although the example described above describes the synchronization module (416) as performing the steps of creating (702) a new volume (710) on the destination storage system (428), storing (704) the data associated with the differences (402) between the snapshot (408, 412) to be replicated to the destination storage system (428) and the most recent version of the snapshot (430, 434) that is stored on the destination storage system (428), creating (706) a snapshot (712) of the new volume (710), and deleting (708) the new volume (710), readers will appreciate that in some embodiments the synchronization module (416) may issue commands or requests to the destination storage system (428) and mechanisms on the destination storage system (428) may perform the claimed steps.

Example embodiments of the present disclosure are described largely in the context of a fully functional computer system for synchronizing snapshots between storage systems. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present invention is limited only by the language of the following claims.

What is claimed is:

1. A method of partially replicating a snapshot between storage systems, the method comprising:
   identifying a most recent version of a snapshot that is stored on a destination storage system, wherein the snapshot is to be replicated to the destination storage system from a source storage system;
   issuing, to the source storage system, a request for an identification of the differences between the snapshot to be replicated to the destination storage system and the most recent version of the snapshot that is stored on the destination storage system;
   receiving from the source storage system, the identification of the differences between the snapshot to be replicated to the destination storage system and the most recent version of the snapshot that is stored on the destination storage system; and
   in response to receiving the identification of the differences, storing as a new version of the snapshot on the destination storage system, only the differences between the snapshot to be replicated and the most recent version of the snapshot that is stored on the destination storage system, wherein the new version of the snapshot does not comprise at least a portion of the data stored in the most recent version of the snapshot that is stored on the destination storage system.

2. The method of claim 1 wherein the source storage system adheres to a first storage architecture and wherein the destination storage system adheres to a second storage architecture.

3. The method of claim 1 further comprising:
   creating a new volume on the destination storage system;
   storing, in the new volume on the destination storage system, the data associated with the differences;
   creating, on the destination storage system, a snapshot of the new volume; and
   deleting the new volume.

4. The method of claim 1 further comprising issuing, to the destination storage system, a request to store hint information associated with the data transferred from the source storage system to the destination storage system.

5. The method of claim 1 further comprising issuing, to the source storage system, a request to delete a stored snapshot.

6. The method of claim 1 further comprising comparing, by the source storage system, the snapshot to be replicated to the destination storage system and the most recent version of the snapshot that is stored on the destination storage system.

7. The method of claim 1 further comprising receiving a configuration file that includes information describing the source storage system, information describing the destination storage system, and information describing a schedule for synchronizing snapshots between the source storage system and the destination storage system.

8. An apparatus for partially replicating a snapshot between storage systems, the apparatus comprising a computer processor, a computer memory operatively coupled to the computer processor, the computer memory having disposed within it computer program instructions that, when executed by the computer processor, cause the apparatus to carry out the steps of:
identifying a most recent version of a snapshot that is stored on a destination storage system, wherein the snapshot is to be replicated to the destination storage system from a source storage system;
issuing, to the source storage system, a request for an identification of the differences between the snapshot to be replicated to the destination storage system and the most recent version of the snapshot that is stored on the destination storage system; and
receiving from the source storage system, the identification of the differences between the snapshot to be replicated to the destination storage system and the most recent version of the snapshot that is stored on the destination storage system; and
in response to receiving the identification of the differences, storing as a new version of the snapshot on the destination storage system, only the differences between the snapshot to be replicated and the most recent version of the snapshot that is stored on the destination storage system, wherein the new version of the snapshot does not comprise at least a portion of the data stored in the most recent version of the snapshot that is stored on the destination storage system.

9. The apparatus of claim 8 wherein the source storage system adheres to a first storage architecture and wherein the destination storage system adheres to a second storage architecture.

10. The apparatus of claim 8 further comprising computer program instructions that, when executed by the computer processor, cause the apparatus to carry out the steps of:
creating a new volume on the destination storage system;
storing, in the new volume on the destination storage system, the data associated with the differences;
creating, on the destination storage system, a snapshot of the new volume; and
deleting the new volume.

11. The apparatus of claim 8 further comprising computer program instructions that, when executed by the computer processor, cause the apparatus to carry out the step of issuing, to the destination storage system, a request to store hint information associated with the data transferred from the source storage system to the destination storage system.

12. The apparatus of claim 8 further comprising computer program instructions that, when executed by the computer processor, cause the apparatus to carry out the step of issuing, to the source storage system, a request to delete a stored snapshot.

13. The apparatus of claim 8 further comprising computer program instructions that, when executed by the computer processor, cause the apparatus to carry out the step of comparing, by the source storage system, the snapshot to be replicated to the destination storage system and the most recent version of the snapshot that is stored on the destination storage system.

14. The apparatus of claim 8 further comprising computer program instructions that, when executed by the computer processor, cause the apparatus to carry out the step of receiving a configuration file that includes information describing the source storage system, information describing the destination storage system, and information describing a schedule for synchronizing snapshots between the source storage system and the destination storage system.

15. A computer program product for partially replicating a snapshot between storage systems, the computer program product disposed upon a computer readable medium, the computer program product comprising computer program instructions that, when executed, cause a computer to carry out the steps of:
identifying a most recent version of a snapshot that is stored on a destination storage system, wherein the snapshot is to be replicated to the destination storage system from a source storage system;
issuing, to the source storage system, a request for an identification of the differences between the snapshot to be replicated to the destination storage system and the most recent version of the snapshot that is stored on the destination storage system; and
receiving from the source storage system, the identification of the differences between the snapshot to be replicated to the destination storage system and the most recent version of the snapshot that is stored on the destination storage system; and
in response to receiving the identification of the differences, storing as a new version of the snapshot on the destination storage system, only the differences between the snapshot to be replicated and the most recent version of the snapshot that is stored on the destination storage system, wherein the new version of the snapshot does not comprise at least a portion of the data stored in the most recent version of the snapshot that is stored on the destination storage system.

16. The computer program product of claim 15 wherein the source storage system adheres to a first storage architecture and wherein the destination storage system adheres to a second storage architecture.

17. The computer program product of claim 15 further comprising computer program instructions that, when executed, cause the computer to carry out the steps of:
creating a new volume on the destination storage system;
storing, in the new volume on the destination storage system, the data associated with the differences;
creating, on the destination storage system, a snapshot of the new volume; and
deleting the new volume.

18. The computer program product of claim 15 further comprising computer program instructions that, when executed, cause the computer to carry out the step of issuing, to the destination storage system, a request to store hint information associated with the data transferred from the source storage system to the destination storage system.

19. The computer program product of claim 15 further comprising computer program instructions that, when executed, cause the computer to carry out the step of issuing, to the source storage system, a request to delete a stored snapshot.

20. The computer program product of claim 15 further comprising computer program instructions that, when executed, cause the computer to carry out the step of receiving a configuration file that includes information describing the source storage system, information describing the destination storage system, and information describing a schedule for synchronizing snapshots between the source storage system and the destination storage system.

* * * * *